(No Model.)
J. W. ANDERSON.
DRAG SAW.
No. 320,039. Patented June 16, 1885.
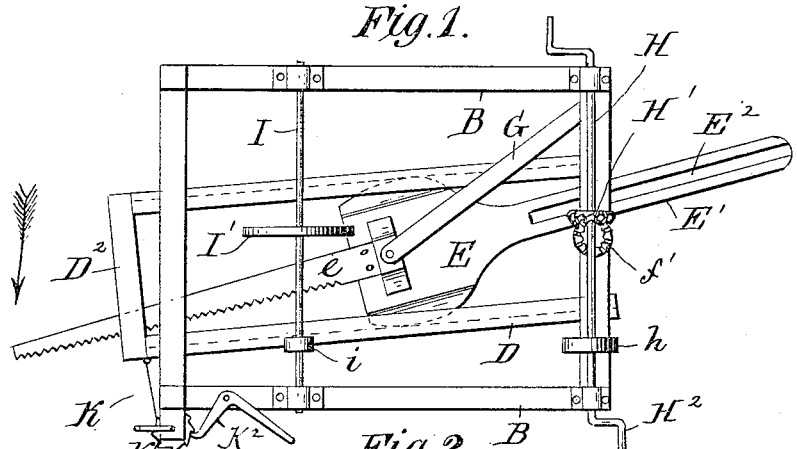
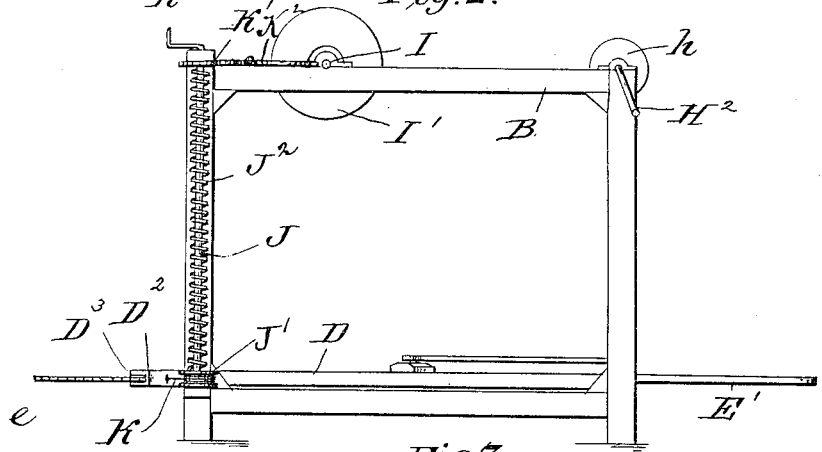
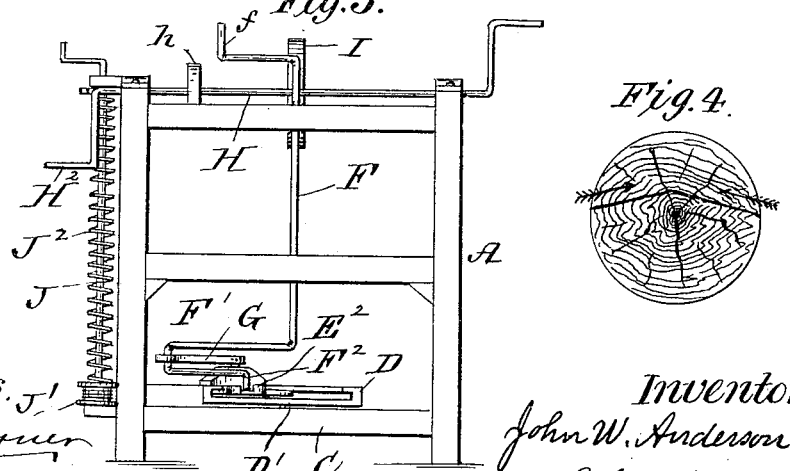
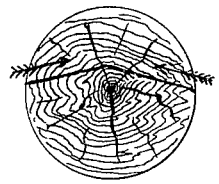
Witnesses
Saml R. Turner
P. B. Turpin
Inventor
John W. Anderson
By R. S. & A. P. Lacey
Attys

UNITED STATES PATENT OFFICE.

JOHN W. ANDERSON, OF BOSCOBEL, WISCONSIN.

DRAG-SAW.

SPECIFICATION forming part of Letters Patent No. 320,039, dated June 16, 1885.

Application filed March 19, 1885. (No model.)

*To all whom it may concern:*

Be it known that I, JOHN W. ANDERSON, a citizen of the United States, residing at Boscobel, in the county of Grant and State of Wisconsin, have invented certain new and useful Improvements in Sawing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to drag-saws, and has for an object to provide convenient constructions for supporting and operating the saw in such manner that said saw may be directed to cut the V-shaped cut desired in sawing heavy logs.

The machine is especially intended for sawing down standing timber.

The invention consists in the combination of the guide-frame and a saw-bearing cross-head held and movable longitudinally in said guide-frame and capable of an oscillation or partial rotation.

It consists, further, in the combination, with the guide-frame and the cross-head, of the drive-shaft, formed and connected with the cross-head in such manner as to automatically drive and give a partial rotation to such cross-head.

Referring to the drawings, Figure 1 is a top plan view, Fig. 2 a side elevation, Fig. 3 a rear elevation, of a machine constructed according to my invention; and Fig. 4 is a diagram representing a section of a tree partially cut by my machine.

The main frame is formed with suitable uprights, A, top bars, B, and base-sills C. On the rear base-sill I pivot at D' the guide-frame D. The other end of this guide-frame extends to and rests on the front base-sill. By preference, I form the front bar, $D^2$, of the guide-frame with a slot, $D^3$, through which the saw-blade operates.

The cross-head E carries the blade $e$, and is supported and movable longitudinally in the frame D. I form the opposite sides of this cross-head in suitable manner, preferably in the arc of a circle, as shown most clearly in Fig. 1. The object of this formation is to permit an oscillation or partial rotation of the cross-head in its operations.

The cross-head is formed or provided with a rear extension or tail-piece, E', in which is formed a longitudinal slot, $E^2$, which may be formed entirely through the extension or only partially through such extension, as desired.

When used independently of the operating mechanism, the extension E' may be used as a handle whereby to oscillate or partially rotate the cross-head in order to give the saw the different directions desired in forming the V-shaped cut. The cross-head also may be forced forward and back by the operator's pushing and drawing on the said handle E'. It is preferred, however, to employ the mechanism for driving the cross-head, as well as that for oscillating the same, which I will now describe.

The drive-shaft F is journaled vertically in the main frame, and is provided at its lower end with a crank, F', and a second crank, $F^2$. The crank F' is connected by a pitman, G, with the body of the cross-head. It is usual and preferable to connect the pitman G with the cross-head at the point or center from which the curved sides of same are struck.

The crank $F^2$ extends into or through the slot $E^2$ of the cross-head.

In operation it will be seen the crank F', as the drive-shaft is revolved, operates, by pitman G, to forcibly operate the cross-head and its saw forward and back, while the crank $F^2$, operating in the slot $E^2$, tends to give such saw one angle or inclination in its outward movement and a different angle in its backward movement, in such manner as to form the cut in approximately the V shape shown in Fig. 4, in which figure I have indicated by arrow the direction of motion of the saw by which each section is cut. It is manifest that it would involve no departure from the principles of my invention to dispense with the crank $F^2$ and extend the crank F' into or through the slot $E^2$, so that said crank will both give the outward and inward movement of the cross-head and the oscillation to said cross-head. This, however, involves a considerable change of angle on the part of the saw, or a restricted longitudinal movement of the same, and for such reasons I prefer to employ the two cranks, as shown.

It is also preferred to arrange the cranks as shown in Fig. 3—the crank F² below and shorter than the crank F'. While for convenience it is preferred to arrange both of these cranks on a single shaft, an equivalent construction would be the forming of the said cranks on different shafts and the gearing of the said separate shafts together or with a common operating mechanism. The shaft F may be driven by means of a hand-crank, $f$, on its upper end, or otherwise suitably arranged, as will be understood from Fig. 3. It is preferred, however, to provide the said shaft with a beveled gear, $f'$, geared by a similar bevel-gear, H', on a horizontal shaft, H, which latter shaft may be operated by hand-cranks H² H² on its opposite ends, as will be understood from Fig. 1.

When the shaft H is used, I prefer to provide it with a band-pulley, $h$, connected by a suitable belt with a band-pulley, $i$, on a parallel shaft, $i$, and to provide the said shaft I with a fly-wheel, I', in order to render the motions of the machine easier and more regular, as will be understood.

It is desirable to provide some means by which to give the guide-frame and the saw carried thereby a tension in the direction indicated by the arrow in Fig. 1. To this end I preferably employ a vertical shaft, J, supported alongside the framing. On the shaft I journal a pulley, J'. A coil-spring, J², is fixed at one end of the shaft J and at its other end to the pulley J'. This coil-spring gives the pulley a tension in one direction, so that the cord K, which is attached at one end to the pulley J' and at its other end to the guide-frame, will draw such frame toward the spring, and thus force the saw into the log or tree. I prefer to journal the shaft J and to provide it with a crank by which it may be turned, and with a ratchet-wheel, K', arranged to be engaged by a pawl, K², on the framing, so the shaft may be held, when desired, by the ratchet, pawl, and crank. The spring may be tightened up and partially released from time to time to give an even tension at all times to the guide-frame.

Having thus described my invention, what I claim, and desire to secure by Letters Patent, is—

1. The combination, with the main frame of a fire-wood drag-saw, of a guide-frame supported thereby, and a saw-carrying cross-head supported by said guide-frame and having a longitudinal and oscillating movement thereon, substantially as and for the purposes described.

2. The combination of a main frame, a guide-frame, a cross-head held and movable longitudinally and oscillating in said frame and provided with a longitudinal slot, a pitman connected at one end with the cross-head, and a drive-shaft having a crank or cranks connected with the pitman and operating in the slot of the cross-head, substantially as set forth.

3. The combination, in a sawing-machine, of a main frame, a pivoted guide-frame, a saw-carrying cross-head held movably in said guide-frame and provided with a longitudinal slot, a pitman connected with said cross-head, and a drive-shaft having two cranks, one of which is connected with the pitman and the other of which extends and operates within the groove of the cross-head, substantially as set forth.

4. The combination of a pivoted guide-frame, a saw-carrying cross-head supported thereon, a shaft located laterally to the guide-frame, a coil-spring placed on the shaft and secured at one end thereto and connected at its other end to the pulley, and a cord or connection secured at the one end to the pulley and at its other end to the guide-frame, as set forth.

5. The combination, with a pivoted guide-frame and a saw-carrying cross-head supported thereon, of a shaft journaled laterally to the guide-frame, and provided with a ratchet-wheel, a pawl arranged to engage said wheel, a pulley on the shaft, a coil-spring, also on the shaft, and having one end fixed to the shaft and its other end fixed to the pulley, and a cord or connection extending between the pulley and frame and suitably connected to said parts, substantially as set forth.

In testimony whereof I affix my signature in presence of two witnesses.

JOHN W. ANDERSON.

Witnesses:
J. McLAUGHLIN,
WM. J. F. NAUERT.